United States Patent [19]

Sasaki et al.

[11] Patent Number: 5,071,814

[45] Date of Patent: Dec. 10, 1991

[54] PROCESS FOR PRODUCING MOLYBDENUM BISMUTH-CONTAINING METAL OXIDE CATALYST

[75] Inventors: Yutaka Sasaki; Kunio Mori; Kiyoshi Moriya, all of Kanagawa, Japan

[73] Assignee: Nitto Chemical Industry Co., Ltd., Tokyo, Japan

[21] Appl. No.: 497,299

[22] Filed: Mar. 22, 1990

[30] Foreign Application Priority Data

Mar. 23, 1989 [JP] Japan .................................. 1-69371

[51] Int. Cl.$^5$ ...................... B01J 21/02; B01J 27/186; B01J 23/16
[52] U.S. Cl. .................................. 502/205; 502/212; 502/243; 502/245; 502/249
[58] Field of Search ............... 502/212, 255, 205, 243, 502/245, 249

[56] References Cited

U.S. PATENT DOCUMENTS

| | | | |
|---|---|---|---|
| 3,497,461 | 2/1970 | McClellan et al. | 502/212 |
| 3,984,477 | 10/1976 | Kubo et al. | 260/604 |
| 4,018,712 | 4/1977 | Li | 502/249 |
| 4,224,187 | 9/1980 | Vanderspurt | 502/212 |
| 4,336,409 | 6/1982 | Yamamoto et al. | 502/212 |
| 4,418,007 | 11/1983 | Derrien | 502/312 |
| 4,541,964 | 9/1985 | Katsumata et al. | 502/212 |

FOREIGN PATENT DOCUMENTS

| | | |
|---|---|---|
| 1945470 | 3/1970 | Fed. Rep. of Germany . |
| 2117225 | 7/1972 | France . |
| 1263139 | 2/1972 | United Kingdom . |

*Primary Examiner*—Carl F. Dees
*Attorney, Agent, or Firm*—Sughrue, Mion, Zinn, Macpeak & Seas

[57] ABSTRACT

A process for producing a molybdenum bismuth-containing metal oxide catalyst comprising: mixing (I) a metal element-containing slurry which contains molybdenum and at least one metal element selected from the group consisting of Fe, Ni, Co, Mg, Cr, Mn, Zn, Pb, La and Ce and which has a pH of 6 or above with (II) a bismuth compound, a solution thereof or a slurry thereof; and then drying and calcining the mixture obtained.

20 Claims, No Drawings

PROCESS FOR PRODUCING MOLYBDENUM BISMUTH-CONTAINING METAL OXIDE CATALYST

FIELD OF THE INVENTION

This invention relates to a process for producing a molybdenum bismuth-containing metal oxide catalyst suitable for gaseous phase oxidation reactions of organic compounds. More particularly, it relates to a process for producing a molybdenum bismuth-containing metal oxide catalyst suitable for oxidation reactions of organic compounds which comprises at least one element selected from the group consisting of divalent metal elements and trivalent metal elements.

Oxidation reactions of organic compounds herein referred to include oxidation, oxidative dehydrogenation and ammoxidation.

BACKGROUND OF THE INVENTION

A number of molybdenum bismuth-based catalysts for oxidation reactions of organic compounds are known Examples of such catalysts include P.Mo.Bi catalysts as disclosed in JP-B-36-3563 (corresponding to U.S. Pat. No. 2,941,007) and JP-B-36-5870 (corresponding to U.S. Pat. No. 2,904,580) (the term "JP-B" as used herein refers to an "examined Japanese patent publication"); P.Mo.Fe.Bi catalysts as disclosed in JP-B-38-17967 (corresponding to U.S. Pat. No. 3,226,422) and JP-B-39-3670 (corresponding to U.S. Pat. No. 3,171,859); Mo.Bi.Sb catalysts as disclosed in JP-B-39-10111; Mo.Bi.Pb catalysts as disclosed in JP-B-42-7774; and Mo.Bi.Cr catalysts as disclosed in JP-A-50-64191 (corresponding to U.S. Pat. No. 4,174,354) (the term "JP-A" as used herein refers to a "published unexamined Japanese patent application"). Further, several improvements have been proposed with respect to catalyst activity as disclosed, e.g., in JP-B-47-27490 (corresponding to U.S. Pat. No. 3,959,384), JP-B-54-22795 (corresponding to U.S. Pat. No. 3,984,477), and JP-B-60-36812 (corresponding to U.S. Pat. Nos. 4,600,541 and 4,377,534).

On the other hand, improvements in the yield of a desired oxidation product have been attempted through the improvements in preparation processes.

For example, JP-B-43-22746 discloses a method comprising adding a bismuth citrate aqueous solution to a molybdic acid aqueous solution; JP-A-53-10388 discloses a method comprising mixing a molybdic acid aqueous solution with a solid bismuth compound and adjusting the pH of the slurry to 8 to 10; JP-A-53-10387 and JP-B-55-12298 (corresponding to U.S. Pat. No. 3,847,831) each discloses a method comprising mixing a molybdic acid aqueous solution with a solid bismuth compound while maintaining the pH of the mixture at a definite level; and JP-B-59-51848 (corresponding to U.S. Pat. No. 4,418,007) discloses a method comprising simultaneously adding a bismuth salt aqueous solution and aqueous ammonia to a molybdic acid aqueous solution having a pH of from 6 to 8. JP-B-59-51849 (corresponding to U.S. Pat. No. 4,388,226) discloses a method comprising adding a bismuth salt aqueous solution to a suspension of a molybdenum compound; JP-A-55-13187 (corresponding to U.S. Pat. No. 4,212,766), JP-A-55-47144 (corresponding to U.S. Pat. No. 4,148,757) and JP-B-60-29536 (corresponding to U.S. Pat. No. 4,040,978) disclose methods comprising preliminarily preparing various molybdates; JP-B-52-22359 and JP-B-52-47435 (corresponding to U.S. Pat. No. 3,872,148) disclose methods comprising preliminarily preparing various bismuth compounds; and JP-A-62-23548 discloses a method comprising using bismuth oxide or basic bismuth carbonate as a bismuth source.

Thus, a number of methods comprising, for example, mixing a molybdic acid aqueous solution with a bismuth compound by a newly devised method or using a specifically selected bismuth material has been proposed.

As JP-B-58-8895 (corresponding to U.S. Pat. No. 4,018,712) shows, an unexpected economical advantage can be achieved by elevating the yield of the target product by 1% in a commodity chemical process (for example, oxidation or ammoxidation of an olefin). Thus, studies for improving catalysts, such as those described above, have been continuously carried out.

On the other hand, a method for preparing a catalyst comprising adjusting the pH of a molybdenum containing slurry and adding a chelating agent (refer to U.S. patent application Ser. No. 480,698 filed on Feb. 15, 1990 and Japanese Patent Application No. 63-210427) has been also proposed. Although the molybdenum bismuth-containing catalysts thus prepared have excellent properties, for example, activity, attrition resistance and ammonia combustion characteristics, the present invention aims at providing further improvements.

SUMMARY OF THE INVENTION

Accordingly, an object of the present invention is to provide a process for producing a molybdenum bismuth-containing metal oxide catalyst useful in various oxidation reactions which has a high activity and which provides a high yield of the target oxidation product.

This object has been achieved by adding a bismuth compound to a mixture of a molybdenum compound with a specific metal compound having a pH of 6 or above.

Namely, the process for producing a molybdenum bismuth-containing metal oxide catalyst of the present invention comprises: mixing (I) a metal element-containing slurry which contains molybdenum and at least one metal element selected from the group consisting of Fe, Ni, Co, Mg, Cr, Mn, Zn, Pb, La and Ce and which has a pH of 6 or above with (II) a bismuth compound, a solution thereof or a slurry thereof; and then drying and calcining the obtained mixture.

DETAILED DESCRIPTION OF THE INVENTION

The composition of the catalyst produced by the process of the present invention may vary depending on the types and amounts of optional components other than the above-mentioned catalytic components. It may be generally represented by the following empirical formula:

$$Mo_aBi_bC_cD_dE_eF_fO_g(SiO_2)_h$$

wherein

C represents at least one element selected from the group consisting of Fe, Ni, Co, Mg, Cr, Mn, Zn, Pb, La and Ce;

D represents at least one element selected from the group consisting of Cu, Ga, Ge, Cd, In, Te, Sn, Sb, V, W, Re, Ru, Rh, Pd, Os, Ir, Pt, Th, U, Pr, Nd, Sm, Eu, Gd, Al, Ti, Ta, Nb and Zr and preferably represents at least one element selected from the group consisting of Cu, Ga, Ge, In, Te, Sn, Sb, V, W, Pd, Pt, U, Al, Ti, Ta, Nb and Zr;

E represents at least one element selected from the group consisting of P and B;

F represents at least one element selected from the group consisting of Li, Na, K, Rb, Cs, Ca, Sr, Ba and Tl and preferably represents at least one element selected from the group consisting of Li, Na, K, Rb and Cs;

O is oxygen; and a, b, c, d, e, f, g and h each represents an atomic ratio, wherein when a is from 8 to 12, b is from 0.01 to 10 (preferably from 0.1 to 8), c is from 0.1 to 25 (preferably from 0.5 to 23), d is from 0 to 35 (preferably from 0 to 30), e is from 0 to 5 (preferably from 0 to 3), f is from 0 to 5 (preferably from 0 to 3), g is the number of oxygen atoms decided by a, b, c, d, e and f so as to form an oxide of the corresponding elements, and h is from 0 to 200 (preferably from 0 to 150).

The optional components other than molybdenum, bismuth and component C can appropriately be selected so as to control the selectivity of the desired reaction product, the reaction rate, catalyst physical properties, and the like.

Raw materials for the components forming the catalyst can be selected from various compounds of the respective elements involved, such as the oxides, the hydroxides, the chlorides, and the nitrates.

Examples of suitable raw materials for the molybdenum component include molybdenum oxides, e.g., molybdenum trioxide, molybdic acid, molybdic acid salts., e.g., ammonium paramolybdate and ammonium metamolybdate, heteropoly-acids, e.g., phosphomolybdic acid and silicomolybdic acid, and heteropoly-acid salts.

Raw materials for the bismuth component include bismuth salts, e.g., bismuth nitrate and bismuth sulfate, bismuth trioxide, and a metallic bismuth oxidation product with nitric acid.

Raw materials for the iron component include ferrous oxide, ferric oxide, ferrosoferric oxide, iron nitrate, iron chloride, and iron hydroxide. Metallic iron dissolved in heated nitric acid can also be employed.

Raw materials for Ni, Co, Mg, Cr, Mn, Zn, Pb, La, Ce and metal elements represented by D, E and F in the above empirical formula can be selected from various compounds of the respective elements, including the oxides, the hydroxides, the chlorides, the nitrates, the sulfates, the acetates and the carbonates.

According to the present invention, the pH of a slurry prepared by mixing a molybdenum compound with the specific metal compound(s) is adjusted to 6 or above and then a bismuth compound is added thereto. Next, the mixture thus obtained is dried and calcined to thereby produce the catalyst of this invention.

It is not at present known how the metal element-containing slurry (I), which contains at least one metal element selected from the group consisting of Fe, Ni, Co, Mg, Cr, Mn, Zn, Pb, La and Ce and molybdenum as essential components and which has a pH of 6 or above, reacts with the bismuth compound, a solution thereof or a slurry thereof (II) and how such contributes to the performance of the resulting catalyst. While not desiring to be bound, it is assumed that when the pH of the slurry of the compound(s) of at least one metal element selected from the group consisting of Fe, Ni, Co, Mg, Cr, Mn, Zn, Pb, La and Ce and the molybdenum compound is adjusted to 6 or above, the at least one metal element preferentially reacts with the molybdenum followed by a reaction with the bismuth compound. On considering industrial workability, the pH of the slurry is preferably adjusted to a range of from 6 to 11.

When the catalyst to be produced contains an iron component, the activity and selectivity of the catalyst can be further elevated by mixing (I) a metal element-containing slurry which contains molybdenum and at least one metal element selected from the group consisting of Fe, Ni, Co, Mg, Cr, Mn, Zn, Pb, La and Ce and which has a pH of 6 or above, (II) a bismuth compound, a solution thereof or a slurry thereof, and (III) an aqueous solution containing iron ion and chelating agents. Iron ions generally form a precipitate at a pH of 2 or above. However, the above-mentioned aqueous solution of iron ion and the chelating agent forms no precipitate even at a high pH and thus forms a stable homogeneous solution. Again, while not desiring to be bound, it is believed that this may promote iron ions interact with the bismuth component and the other catalyst components, thus elevating the catalyst activity.

When a silica sol is used as a carrier material, it is preferable that at least some portion of the silica sol is present in the above-mentioned slurry (I). When the slurry also contains a chelating agent, the gelation of the slurry is inhibited and thus the slurry is maintained at low viscosity and the properties of the slurry are stabilized. As a result, the catalyst obtained has large strength. If the pH of the slurry which contains silica sol is adjusted to 6 or above without using chelating agents, gelation of silica sol proceeds to increase the viscosity of the slurry so that the slurry cannot be sufficiently stirred. In this case, satisfactory results cannot be obtained with respect to physical properties of the catalyst, particularly strength.

As stated above, while the mechanism of the effects produced by addition of the chelating agent is not clear, what is important is that gelation of the slurry is inhibited. While not desiring to be bound, it may well be that the chelating agent when present serves as a metallic ion masking agent to inhibit metallic ions from neutralizing the charges of the silica sol particles.

The chelating agent which can be used in the present invention possesses the function of inhibiting gelation. Examples of suitable chelating agents which can be used include amines, e.g., ethylenediamine, trimethylenediamine, tetraethylenediamine, N,N'-dimethylethylenediamine, triethanolamine, pyridine, and bipyridyl; aminopolycarboxylic acids, e.g., ethylenediaminediacetic acid, ethylenediaminetetraacetic acid, and nitrilotriacetic acid; polycarboxylic acids, e.g., oxalic acid, malonic acid, succinic acid, glutaric acid, maleic acid, fumaric acid, citraconic acid, itaconic acid, adipic acid, diglycolic acid, tricarballylic acid, and propane-1,1,2,3-tetracarboxylic acid; aromatic carboxylic acid, e.g., phthalic acid, mandelic acid, sulfosalicylic acid, and benzoic acid; hydroxycarboxylic acids and keto-carboxylic acids, e.g., glycolic acid, lactic acid, hydroxypropionic acid, malic acid, tartaric acid, citric acid, isocitric acid, gluconic acid, ascorbic acid, pyruvic acid, oxalacetic acid, and diglycolic acid; thiols and sulfur compounds, e.g., thioglycolic acid, thiodiglycolic acid, and mercaptopropanol; amino acids, e.g., glycine, alanine, asparagine, glutamic acid, methionine, and phenylalanine; diketones, e.g., acetylacetone, acetonylacetone, and benzoylacetone; phosphonic acids, e.g., phosphonopropane -1,2,3-tricarboxylic acid and phosphonomethyliminodiacetic acid; and chelated compounds formed by these chelating agents and a catalyst forming element, preferably ethylenediamine, trimethylenediamine, triethanolamine, and pyridine; ethylenediaminediacetic acid, ethylenediaminetetraacetic acid and nitrilotriacetic acid; oxalic acid, malonic acid, succinic acid, glutaric acid, maleic acid, and fumaric acid; glycolic acid, lactic acid, hydroxypropionic acid, malic acid, tartaric acid, citric acid, isocitric acid, gluconic acid, and ascorbic acid; thioglycolic acid and thiodiglycolic acid; glycine, alanine, asparagine, and glutamic acid; acetylacetone, and acetonylacetone; and phosphonopropane-1,2,3-tricarboxylic acid.

These chelating agents may be used either individually or as a combination of two or more thereof. The chelating agent to be used is preferably water-soluble.

The amount of the chelating agent to be added preferably ranges from 0.1 to 10% by weight, more preferably from 0.5 to 8% by weight, based on the weight of the oxide catalyst ultimately obtained. If the amount is less than 0.1% by weight, the effect of improving catalyst strength is small, and if the amount exceeds 10% by weight, the resulting catalyst sometimes cracks.

In the preparation of the aqueous solution containing the iron ions and the chelating agent, it is preferable to use the chelating agent in an amount of 0.1 to 2 gram molecules per gram ion of the iron ions.

In the process of the present invention, it is not always necessary to heat the slurry. It is desirable, however, to heat the slurry (I) in the mixture to 50° to 120° C. so as to stabilize the properties of the slurry and further improve the performance of the final product, namely, the target catalyst. In this case, it is advantageous to heat the slurry at the temperature as specified above at least for 10 minutes.

For example, the above-mentioned slurry (I) and the bismuth compound (II), optionally together with the above-mentioned aqueous solution (III) containing iron ions and the chelating agent, are mixed together and the slurry obtained is heated to 50° to 120° C. while maintaining the slurry as such. Alternately, the above-mentioned slurry (I) is heated to 50° to 120° C. while maintaining the slurry as such before mixing the same with the above-mentioned bismuth component (II) optionally together with the above-mentioned aqueous solution (III) containing iron ions and the chelating agent.

The slurry thus prepared is then dried at temperature of from 100° to 400° C. and calcined at a temperature of from about 400° to about 800° C., preferably from 500° to 750° C. for about 1 to about 50 hours. When a fluidized bed catalyst is to be produced, it is preferable to conduct the drying with a spray drier. Thus, the catalyst of the present invention can be obtained.

Although this catalyst shows an excellent activity in the absence of any carrier, it may be bound to an appropriate carrier. Suitable carriers include alumina, zirconia, silica/alumina, silicone carbide, alundum and inorganic silicates, in addition to the above-mentioned silica. In the case of this catalyst, it is particularly recommended to use silica as the carrier. The amount of the carrier may generally range from approximately 10 to 90% based on the total weight of the catalyst.

The catalyst of the present invention may be used either in a fixed bed or in a fluidized bed. Neither the size nor the form of the catalyst is particularly limited. Thus, it may be molded into an arbitrary form (for example, pellets, tablets, spheres, a powder, granules, etc., depending on the conditions.

The catalyst of the present invention is suitable for use in oxidation reactions of organic compounds, namely, oxidation, oxidative dehydrogenation and ammoxidation.

Organic compounds which can be subjected to oxidation reactions using the catalyst of the invention include propylene, isobutene, methanol, ethanol, t-butanol, methyl t-butyl ether, etc., and the corresponding aldehydes, nitriles, conjugated dienes, etc., are obtained in high yields from these organic compounds. Particularly satisfactory results can be obtained when the catalyst is applied to an oxidation reaction of propylene, isobutene, or t-butanol.

The oxidation, ammoxidation and oxidative dehydrogenation of organic compounds to which the process of this invention can be applied may be performed under any conventional conditions known in the art. Namely, the molar ratio of the feed gas is in a range of 1/0.5-10-/0-5 as organic compound/oxygen/ammonia (molar ratio) and the reaction temperature is in a range of 300° to 600° C. The reaction pressure used is in a range of atmospheric pressure to 3 kg/cm$^2$G. The feed gas used may be diluted with nitrogen, steam, carbon dioxide or helium, etc.

The process of the present invention for producing a molybdenum bismuth-containing metal oxide catalyst, wherein a specific bismuth compound is used and an iron compound is added in a specific manner, makes it possible to enhance the catalytic activity of the product. Thus, the target oxidation product can be obtained at a high yield. Since this catalyst has low ammonia-combustion characteristics, it is particularly effective as an ammoxidation catalyst.

The following examples are given to further illustrate the present invention but the present invention is not to be construed as being limited thereto. All percents are given on a weight basis unless otherwise specified. In the Examples and Comparative Examples, the strength and activity of the catalyst were evaluated in accordance with the following test methods.

Attrition Testing:

Attrition testing carried out according to the method described in *Test Method for Synthetic Cracking Catalysts*, 6/31-4m-1/57, American Cyanamid Co., which is known as a test method for catalysts for fluid catalytic cracking process. Attrition loss (%) was calculated from the following relationship:

$$\text{Attrition Loss (\%):} R = B \times 100/(C - A)$$

wherein A is the weight loss of the catalyst on attrition within the first 5 hours; B is the weight loss of the catalyst after 5 hours of attrition up to 25 hours of attrition; and C is the weight of a catalyst being tested (C=50 (g) in this test).

The higher the attrition resistance of the catalyst, the smaller the attrition loss (R value).

Activity Testing:

The activity of the fluid bed catalyst was tested using ammoxidation of propylene as a representative reaction as follows.

The catalyst tested was charged in a fluidized bed reactor having an inner diameter of 25 mm and a height of 40 cm so as to have a prescribed contact time and maintained at a reaction temperature of 410° C. A mixed gas of propylene, ammonia, and oxygen (as air) at a molar ratio of 1:1.2:1.95 was fed to the reactor at a feed rate of 6.5 liters per hour (NTP conversion). The reaction pressure was atmospheric.

The yield of ammoxidation product (acrylonitrile), the conversion of starting organic compound (propylene), and the ammonia combustion were calculated using the relationships shown below.

Acrylonitrile Yield (%) =

$$\frac{\text{Weight of Carbon in Acrylonitrile Produced}}{\text{Weight of Carbon in Propylene Fed}} \times 100$$

Propylene Conversion (%) =

$$\frac{\text{Weight of Carbon in Propylene Compound}}{\text{Weight of Carbon in Propylene Fed}} \times 100$$

Ammonia Combustion (%) =

$$\frac{\begin{array}{c}\text{(Weight of Nitrogen in Ammonia Fed)} - \\ \text{(Weight of Nitrogen in Unreacted Ammonia)} - \\ \text{(Weight of Nitrogen in Collected Nitrogen} - \\ \text{Containing Organic Compound)}\end{array}}{\text{Weight of Nitrogen in Ammonia Fed}} \times 100$$

EXAMPLE 1

A catalyst having the empirical formula $Mo_{10}Bi_{1.0}Fe_{2.0}Ni_{6.5}Sb_{15}P_{0.2}K_{0.4}O_{71.7}(SiO_2)_{60}$ was prepared as follows.

In 20 ml of water was dissolved 3.92 g of potassium nitrate, and the solution was added to 1,745 g of a 20% silica sol. A solution of 171.0 g of ammonium paramolybdate in 510 ml of water was added to the above mixture with stirring. Subsequently, a solution of 225.6 g of antimony tetroxide powder and 186.8 g of nickel nitrate in 190 ml of water, a solution of 79.8 g of iron nitrate in 80 ml of water, and 2.23 g of a 85% phosphoric acid aqueous solution were successively added thereto to prepare a slurry. A 15% aqueous ammonia was added to the slurry with stirring to adjust the pH of the slurry to a pH of 8. To the slurry was added a solution of 47.9 g of bismuth nitrate in 48 ml of 10% nitric acid with stirring.

The slurry was spray dried in a rotary disc type spray drier with the inlet temperature and the outlet temperature being controlled at 320° C. and 160° C., respectively. The resulting fine particles were heated at 250° C., then calcined at 400° C. for 2.5 hours, and finally calcined at 620° C. for 3 hours.

EXAMPLE 2

The procedure of Example 1 was repeated except that the bismuth nitrate aqueous solution used in Example 1 was replaced by a bismuth compound precipitate, which had been obtained by adding water and a diluted aqueous ammonia to a bismuth nitrate aqueous solution, to thereby give a catalyst of the same composition.

EXAMPLE 3

The procedure of Example 1 was repeated except that the iron nitrate aqueous solution used in Example 1 was replaced by a solution, which had been obtained by dissolving iron nitrate and citric acid (16 g) in 80 ml of water, and that the aqueous solution was added to a slurry whose pH had been adjusted to 8 to thereby give a catalyst of the same composition.

EXAMPLE 4

The procedure of Example 1 was repeated except that the mixture described in Example 1 prior to the spray drying was heated under reflux at 100° C. for 2 hours to thereby give a catalyst of the same composition.

EXAMPLE 5

The procedure of Example 3 was repeated except that the mixture described in Example 3 prior to the spray drying was heated under reflux at 100° C. for 2 hours to thereby give a catalyst of the same composition.

EXAMPLE 6

The procedure of Example 1 was repeated except that the slurry described in Example 1 prior to the mixing with the bismuth nitrate aqueous solution was heated under reflux at 100° C. for 2 hours to thereby give a catalyst of the same composition.

EXAMPLE 7

The procedure of Example 3 was repeated except that the slurry described in Example 3 prior to the mixing with the aqueous solution of iron nitrate and citric acid and the bismuth nitrate aqueous solution was heated under reflux at 100° C. for 2 hours to thereby give a catalyst of the same composition.

EXAMPLE 8

The procedure of Example 7 was repeated except that the slurry described in Example 7 prior to the addition of the aqueous ammonia was mixed with 40 g of gluconic acid to thereby give a catalyst of the same composition.

EXAMPLE 9

A catalyst having the empirical formula of $Mo_{10}Bi_{2.5}Fe_{2.0}Ni_{5.5}Sb_5K_{0.2}O_{72.35}(SiO_2)_{60}$ was prepared as follows.

In 23 ml of water was dissolved 2.32 g of potassium nitrate, and the solution was mixed with 2,067 g of 20% silica sol. A solution of 202.5 g of ammonium paramolybdate in 610 ml of water was added to the above mixture with stirring. Subsequently, a solution of 89.1 g of antimony tetraoxide powder and 187.2 g of nickel nitrate in 190 ml of water and a solution of 94.6 g of iron nitrate in 95 ml of water were successively added thereto to prepare a slurry. 15% and 28% aqueous ammonia were added to the slurry with stirring to adjust the slurry to a pH of 10. The slurry was mixed with a solution of 141.9 g of bismuth nitrate in 140 ml of 10% nitric acid. The mixture thus obtained was spray-dried and calcined in the same manner as described in Example 1.

EXAMPLE 10

A catalyst having the empirical formula of $Mo_{10}Bi_{1.5}Fe_{1.5}Ni_{6.0}P_{1.0}K_{0.2}O_{43.1}(SiO_2)_{60}$ was prepared as follows.

In 25 ml of water was dissolved 2.68 g of potassium nitrate, and the solution was mixed with 2,387 g of 20% silica sol. A solution of 233.8 g of ammonium paramolybdate in 700 ml of water was added to the above mixture with stirring. Subsequently, a solution of 235.7 g of nickel nitrate in 235 ml of water, a solution of 81.9 g of iron nitrate in 80 ml of water and 1.53 g of a 85% phosphoric acid aqueous solution were successively added thereto to prepare a slurry. 15% and 28% aqueous ammonia were added to the slurry with stirring to adjust the slurry to a pH of 11. The slurry was mixed with a solution of 98.3 g of bismuth nitrate in 100 ml of 10% nitric acid. The mixture thus obtained was spray-dried and calcined in the same manner as described in Example 1.

EXAMPLES 11 AND 12

Catalysts of the compositions specified in Table 1 below were prepared, each in the same manner as the catalyst described in Example 1.

EXAMPLES 13 TO 15

Catalysts of the compositions specified in Table 1 below were prepared each in the same manner as the catalyst described in Example 3, except that the pH of the slurry was adjusted to a pH of 9.5 and that the citric acid was replaced by nitrilotriacetic acid (Example 13), ethylenediaminetetraacetic acid (Example 14) or glycolic acid (Example 15).

EXAMPLES 16 AND 17

Catalysts of the compositions specified in Table 1 below were prepared each in the same manner as the catalyst described in Example 5, except that the pH of the slurry was adjusted to a pH of 8.5 and that the citric acid was replaced by glycolic acid (Example 16) or tartaric acid (Example 17).

EXAMPLES 18 TO 20

Catalysts of the compositions specified in Table 1 below were prepared each in the same manner as the catalyst described in Example 7, except that the citric acid was replaced by acetylacetone (Example 18), ascorbic acid (Example 19) or phosphonopropane-1,2,3-tricarboxylic acid (Example 20).

EXAMPLE 21

A catalyst of the composition specified in Table 1 below was prepared in the same manner as the catalyst described in Example 7, except that the pH of the slurry was adjusted to a pH of 8.5.

EXAMPLE 22

A catalyst of the composition specified in Table 1 below was prepared in the same manner as the catalyst described in Example 21, except that ethylenediamine in an amount corresponding to 5% based on the weight of the catalyst oxide was added before adjusting the pH of the slurry.

EXAMPLE 23

A catalyst of the composition specified in Table 1 below was prepared in the same manner as the catalyst described in Example 7, except that the pH of the slurry was adjusted to a pH of 9.5.

EXAMPLE 24

A catalyst of the composition specified in Table 1 below was prepared in the same manner as the catalyst described in Example 23, except that citric acid in an amount corresponding to 5% of the weight of the catalyst oxide was added before adjusting the pH of the slurry and one half of the silica sol used was mixed with the slurry after heating.

EXAMPLE 25

A catalyst of the composition specified in Table 1 below was prepared in the same manner as the catalyst described in Example 7, except that the pH of the slurry was adjusted to a pH of 6.5.

EXAMPLE 26

A catalyst of the composition specified in Table 1 below was prepared in the same manner as the catalyst described in Example 25, except that phosphonopropane -1,2,3-tricarboxylic acid in an amount corresponding to 5% of the weight of the catalyst oxide was added before adjusting the pH of the slurry and one half of the silica sol used was mixed with the slurry after heating.

The activities of the catalysts obtained in Examples 1 to 26 were tested. Table 1 below shows the results obtained. Further, the attrition resistances of typical examples of these catalysts were evaluated. Table 2 below shows the results obtained.

COMPARATIVE EXAMPLE 1

A catalyst of the same composition of the catalyst described in Example 1 was produced in the same manner as the catalyst described in Example 1, except that the pH of the slurry before mixing with the bismuth nitrate aqueous solution was adjusted to a pH of 5.

COMPARATIVE EXAMPLE 2

A catalyst of the same composition of the catalyst described in Example 1 was produced in the same manner as the catalyst described in Example 1, except that the bismuth nitrate aqueous solution was added following the phosphoric acid aqueous solution and then the pH of the slurry was adjusted to a pH of 8.

COMPARATIVE EXAMPLE 3

A catalyst of the same composition of the catalyst described in Example 1 was produced in the same manner as the catalyst described in Example 3, except that the solution of iron nitrate and citric acid in water and the bismuth nitrate aqueous solution were mixed following the phosphoric acid aqueous solution and then the pH of the slurry was adjusted to a pH of 2.0.

COMPARATIVE EXAMPLE 4

A catalyst of the same composition of the catalyst described in Example 1 was produced in the same manner as the catalyst described in Example 8, except that the pH of the slurry before heating was adjusted to a pH of 5.0.

COMPARATIVE EXAMPLE 5

A catalyst of the same composition of the catalyst described in Example 9 was produced in the same manner as the catalyst described in Example 9, except that the bismuth nitrate aqueous solution was added to the slurry before adjusting the pH and then the pH of the slurry was adjusted to a pH of 10.

COMPARATIVE EXAMPLE 6

A catalyst of the same composition of the catalyst described in Example 10 was produced in the same manner as the catalyst described in Example 10, except that the bismuth nitrate aqueous solution was added to the slurry before adjusting the pH and then the pH of the slurry was adjusted to a pH of 11.

COMPARATIVE EXAMPLES 7 AND 8

A catalyst of the same composition of the catalyst described in Example 11 or 12 was produced each in the same manner as the catalyst described in Example 1, except that the bismuth nitrate aqueous solution was added to the slurry before adjusting the pH and then the pH of the slurry was adjusted to a pH of 2.

COMPARATIVE EXAMPLES 9 AND 10

A catalyst of the same composition of the catalyst described in Example 13 or 14 was produced each in the same manner as the catalyst described in Example 13 or 14, except that the solution of iron nitrate and the chelating agent in water and the bismuth nitrate aqueous solution were added to the slurry before adjusting the pH and then the pH of the slurry was adjusted to a pH of 9.5.

COMPARATIVE EXAMPLE 11

A catalyst of the same composition of the catalyst described in Example 16 was produced in the same manner as the catalyst described in Example 16, except that the aqueous solution of iron nitrate and gluconic acid and the bismuth nitrate aqueous solution were added to the slurry before adjusting the pH and then the pH of the slurry was adjusted to a pH of 8.5.

COMPARATIVE EXAMPLE 12

A catalyst of the same composition of the catalyst described in Example 18 was produced in the same manner as the catalyst described in Example 18, except that the pH of the slurry before heating was adjusted to a pH of 3.0.

COMPARATIVE EXAMPLE 13

A catalyst of the same composition of the catalyst described in Example 24 was produced in the same manner as the catalyst described in Example 7, except that the pH of the slurry before heating was adjusted to a pH of 2.0.

Table 3 below shows the results of the activity test of the catalysts obtained in Comparative Examples 1 to 13.

TABLE 1

| Example No. | Composition (atomic ratio) | | | | | | | | |
|---|---|---|---|---|---|---|---|---|---|
| | Mo | Bi | C | | D | | E | F | |
| | | | Fe | Ni | Sb | | P | K | Si |
| 1 | 10 | 1.0 | 2.0 | 6.5 | — | 15 | — | 0.2 | 0.4 | 60 |
| 2 | 10 | 1.0 | 2.0 | 6.5 | — | 15 | — | 0.2 | 0.4 | 60 |
| 3 | 10 | 1.0 | 2.0 | 6.5 | — | 15 | — | 0.2 | 0.4 | 60 |
| 4 | 10 | 1.0 | 2.0 | 6.5 | — | 15 | — | 0.2 | 0.4 | 60 |
| 5 | 10 | 1.0 | 2.0 | 6.5 | — | 15 | — | 0.2 | 0.4 | 60 |
| 6 | 10 | 1.0 | 2.0 | 6.5 | — | 15 | — | 0.2 | 0.4 | 60 |
| 7 | 10 | 1.0 | 2.0 | 6.5 | — | 15 | — | 0.2 | 0.4 | 60 |
| 8 | 10 | 1.0 | 2.0 | 6.5 | — | 15 | — | 0.2 | 0.4 | 60 |
| 9 | 10 | 2.5 | 2.0 | 5.5 | — | 5 | — | — | 0.2 | 60 |
| 10 | 10 | 1.5 | 1.5 | 6.0 | — | — | — | 1.0 | 0.2 | 60 |
| 11 | 10 | 3.0 | 6.0 | — | — | — | — | — | 0.4 | 60 |
| 12 | 10 | 2.0 | — | — | (Pb) 6.0 | — | — | — | 0.4 | 60 |
| 13 | 10 | 2.0 | 2.0 | — | (Co) 6.5 | — | — | — | 0.2 | 60 |
| 14 | 10 | 2.0 | 2.0 | 5.0 | (Mg) 1.5 | — | — | — | 0.2 | 60 |
| 15 | 10 | 2.0 | 2.0 | 5.0 | (Zn) 1.5 | — | — | — | 0.2 | 60 |
| 16 | 10 | 1.0 | 1.0 | 6.0 | (Cr) 1.0 | — | — | — | 0.2 | 60 |
| 17 | 10 | 1.0 | 1.0 | 6.0 | (Mn) 1.0 | — | — | — | 0.2 | 60 |
| 18 | 10 | 1.5 | 0.5 | 6.0 | (La) 1.0 | 10 | — | — | 0.5 | 40 |
| 19 | 10 | 1.5 | 0.5 | 6.0 | (Ce) 0.5 | 10 | — | — | 0.5 | 40 |
| 20 | 10 | 1.0 | 1.0 | 6.5 | — | 15 | (W) 0.5 | — | 0.2 | 40 |
| 21 | 10 | 1.0 | 1.0 | 6.5 | — | 15 | (Te) 0.5 | — | 0.2 | 90 |
| 22 | 10 | 1.0 | 1.0 | 6.5 | — | 15 | — | (B) 0.5 | 0.2 | 90 |
| 23 | 10 | 1.0 | 1.0 | 6.5 | — | 10 | — | (B) 0.5 | 1.0 | 90 |
| 24 | 10 | 1.0 | 1.0 | 6.5 | — | 10 | — | — | 1.0 | 90 |
| 25 | 10 | 0.5 | 1.5 | 6.5 | — | 20 | — | — | (Cs) 0.05 | 90 |
| 26 | 10 | 0.5 | 1.5 | 6.5 | — | 20 | — | — | (Cs) 0.05 | 90 |

| Example No. | Conditions of Slurry Preparation | | | | | Calcination Temperature (°C.) | Reaction Conditions | | Reaction Results | | |
|---|---|---|---|---|---|---|---|---|---|---|---|
| | pH | Heating Temperature (°C.) | Addition Point | | | | Temperature (°C.) | Contact Time (sec) | Acrylonitrile Yield (°C.) | Propylene Conversion (%) | Ammonia Combustion (%) |
| | | | Bi | Fe Chelating Agent Aqueous Solution | Chelating Agent Present in Slurry (I) | | | | | | |
| 1 | 8.0 | — | After adjusting pH | — | — | 620 | 410 | 4.0 | 86.3 | 98.9 | 16.5 |
| 2 | 8.0 | — | After adjusting pH | — | — | 620 | 410 | 4.0 | 86.2 | 99.0 | 16.8 |
| 3 | 8.0 | — | After adjusting pH | After adjusting pH | — | 630 | 410 | 4.0 | 86.5 | 98.8 | 16.0 |
| 4 | 8.0 | 100 | Before heating | — | — | 620 | 410 | 4.0 | 86.6 | 99.1 | 14.7 |
| 5 | 8.0 | 100 | Before heating | Before heating | — | 620 | 410 | 4.0 | 86.9 | 99.0 | 14.0 |
| 6 | 8.0 | 100 | After heating | — | — | 610 | 410 | 4.0 | 87.0 | 99.2 | 14.5 |
| 7 | 8.0 | 100 | After | After | — | 640 | 410 | 3.5 | 87.5 | 99.1 | 13.5 |

TABLE 1-continued

| | | | | | | | | | | | |
|---|---|---|---|---|---|---|---|---|---|---|---|
| 8 | 8.0 | 100 | After heating | After heating | Gluconic Acid | 620 | 410 | 3.5 | 87.4 | 98.8 | 13.4 |
| 9 | 10 | — | After adjusting pH | — | — | 600 | 410 | 4.0 | 86.0 | 99.0 | 16.0 |
| 10 | 11 | — | After adjusting pH | — | — | 580 | 410 | 4.0 | 85.7 | 99.2 | 15.8 |
| 11 | 8.0 | — | After adjusting pH | — | — | 600 | 430 | 4.5 | 79.5 | 99.8 | 16.0 |
| 12 | 8.0 | — | After adjusting pH | — | — | 600 | 470 | 5.0 | 82.5 | 98.5 | 14.0 |
| 13 | 9.5 | — | After adjusting pH | After adjusting pH | — | 575 | 410 | 4.5 | 85.8 | 98.7 | 14.2 |
| 14 | 9.5 | — | After adjusting pH | After adjusting pH | — | 590 | 410 | 4.0 | 86.4 | 98.5 | 13.5 |
| 15 | 9.5 | — | After adjusting pH | After adjusting pH | — | 590 | 410 | 4.0 | 86.2 | 98.0 | 15.5 |
| 16 | 8.5 | 100 | Before heating | Before heating | — | 620 | 410 | 4.0 | 86.5 | 98.8 | 15.0 |
| 17 | 8.5 | 100 | Before heating | Before heating | — | 620 | 410 | 4.0 | 86.6 | 99.0 | 14.1 |
| 18 | 8.5 | 100 | After heating | After heating | — | 620 | 410 | 4.0 | 86.8 | 98.9 | 13.9 |
| 19 | 8.5 | 100 | After heating | After heating | — | 620 | 410 | 4.0 | 87.0 | 98.5 | 14.5 |
| 20 | 8.5 | 100 | After heating | After heating | — | 620 | 410 | 4.0 | 87.1 | 99.1 | 14.0 |
| 21 | 8.5 | 100 | After heating | After heating | — | 630 | 410 | 4.5 | 87.2 | 99.0 | 16.0 |
| 22 | 8.5 | 100 | After heating | After heating | Ethylene-diamine | 630 | 410 | 4.5 | 87.1 | 98.9 | 16.1 |
| 23 | 9.5 | 100 | After heating | After heating | — | 630 | 410 | 4.5 | 86.7 | 98.9 | 13.5 |
| 24 | 9.5 | 100 | After heating | After heating | Citric Acid | 630 | 410 | 4.5 | 86.5 | 99.0 | 13.7 |
| 25 | 6.5 | 100 | After heating | After heating | — | 630 | 410 | 4.5 | 86.0 | 99.1 | 15.7 |
| 26 | 6.5 | 100 | After heating | After heating | Phosphono-propane-1,2,3-tricarboxylic Acid | 630 | 410 | 4.5 | 85.9 | 99.0 | 15.6 |

TABLE 2

| Comparative Example No. | Composition (atomic ratio) | | | | | | | | |
|---|---|---|---|---|---|---|---|---|---|
| | Mo | Bi | C | | D | E | F | | Si |
| | | | Fe | Ni | Sb | P | K | | |
| 1 | 10 | 1.0 | 2.0 | 6.5 | — | 15 | — | 0.2 | 0.4 | 60 |
| 2 | 10 | 1.0 | 2.0 | 6.5 | — | 15 | — | 0.2 | 0.4 | 60 |
| 3 | 10 | 1.0 | 2.0 | 6.5 | — | 15 | — | 0.2 | 0.4 | 60 |
| 4 | 10 | 1.0 | 2.0 | 6.5 | — | 15 | — | 0.2 | 0.4 | 60 |
| 5 | 10 | 2.5 | 2.0 | 5.5 | — | 5 | — | — | 0.2 | 60 |
| 6 | 10 | 1.5 | 1.5 | 6.0 | — | — | — | 1.0 | 0.2 | 60 |
| 7 | 10 | 3.0 | 6.0 | — | — | — | — | — | 0.4 | 60 |
| 8 | 10 | 2.0 | — | — | (Pb) 6.0 | — | — | — | 0.4 | 60 |
| 9 | 10 | 2.0 | 2.0 | — | (Co) 6.5 | — | — | — | 0.2 | 60 |
| 10 | 10 | 2.0 | 2.0 | 5.0 | (Mg) 1.5 | — | — | — | 0.2 | 60 |
| 11 | 10 | 1.0 | 1.0 | 6.0 | (Cr) 1.0 | — | — | — | 0.2 | 60 |
| 12 | 10 | 1.5 | 0.5 | 6.0 | (La) 1.0 | 10 | — | — | 0.5 | 40 |
| 13 | 10 | 1.0 | 1.0 | 6.5 | — | 10 | — | — | 1.0 | 90 |

| Comparative Example No. | Conditions of Slurry Preparation | | | | Calcination Temperature (°C.) | Reaction Conditions | | Reaction Results | | |
|---|---|---|---|---|---|---|---|---|---|---|
| | Heating Temperature (°C.) | Addition Point | | | | Temperature (°C.) | Contact Time (sec) | Acrylonitrile Yield (°C.) | Propylene Conversion (%) | Ammonia Combustion (%) |
| | pH | | Fe Chelating Agent Aqueous Solution Bi | Chelating Agent Present in Slurry (I) | | | | | | |
| 1 | 5.0 | — | After adjusting pH | — | — | 620 | 410 | 4.5 | 83.6 | 99.1 | 23.6 |

5,071,814

TABLE 2-continued

| Example No. | | | | | | | | | | | |
|---|---|---|---|---|---|---|---|---|---|---|---|
| 2 | 8.0 | — | Before adjusting pH | — | — | 620 | 410 | 4.0 | 85.2 | 98.7 | 16.2 |
| 3 | 2.0 | — | Before adjusting pH | Before adjusting pH | — | 620 | 410 | 4.5 | 83.7 | 99.0 | 22.7 |
| 4 | 5.0 | 100 | After heating | After heating | Gluconic Acid | 620 | 410 | 4.0 | 83.9 | 98.8 | 22.5 |
| 5 | 10.0 | — | Before adjusting pH | — | — | 620 | 410 | 4.0 | 85.0 | 99.1 | 15.4 |
| 6 | 11.0 | — | Before adjusting pH | — | — | 620 | 410 | 4.0 | 84.5 | 99.0 | 16.5 |
| 7 | 2.0 | — | Before adjusting pH | — | — | 600 | 430 | 5.0 | 76.7 | 98.8 | 23.2 |
| 8 | 2.0 | — | Before adjusting pH | — | — | 600 | 470 | 5.0 | 80.6 | 97.5 | 21.4 |
| 9 | 9.5 | — | Before adjusting pH | — | — | 550 | 410 | 4.5 | 84.0 | 98.6 | 16.3 |
| 10 | 9.5 | — | Before adjusting pH | — | — | 590 | 410 | 4.5 | 84.3 | 98.9 | 17.0 |
| 11 | 8.5 | 100 | Before adjusting pH | Before adjusting pH | — | 620 | 410 | 4.0 | 85.3 | 98.7 | 17.0 |
| 12 | 3.0 | 100 | After heating | After heating | — | 620 | 410 | 3.0 | 83.6 | 98.7 | 23.5 |
| 13 | 2.0 | 100 | After heating | After heating | Citric Acid | 620 | 410 | 6.0 | 82.9 | 98.3 | 25.2 |

TABLE 3

| Example No. | Chelating Agent in Slurry (I) | Attrition Loss (R) |
|---|---|---|
| 7 | — | 3.5 |
| 8 | Gluconic Acid | 1.2 |
| 21 | — | 4.0 |
| 22 | Ethylenediamine | 1.7 |
| 23 | — | 3.7 |
| 24 | Citric Acid | 1.6 |
| 25 | — | 4.1 |
| 26 | Phosphonopropane-1,2,3-tricarboxylic Acid | 1.8 |

While the invention has been described in detail and with reference to specific embodiments thereof, it will be apparent to one skilled in the art that various changes and modifications can be made therein without departing from the spirit and scope thereof.

What is claimed is:

1. A process for producing a molybdenum bismuth-containing metal oxide catalyst comprising: mixing
   (I) a metal element-containing slurry which contains molybdenum and at least one metal element selected from the group consisting of Fe, Ni, Co, Mg, Cr, Mn, Zn, Pb, La and Ce and which has a pH of 6.5 or above with
   (II) a bismuth compound, a solution thereof or a slurry thereof; and
   then drying and calcining the mixture obtained.

2. A process as claimed in claim 1, wherein said process comprises heating said slurry (I) or a mixture of said slurry (I) and said bismuth component (II) to 50° to 120° C. while maintaining the slurry as such.

3. A process as claimed in claim 1, wherein said slurry contains silica sol, or silica sol and a chelating agent.

4. A process as claimed in claim 1, wherein said pH is within a range of 6.5 to 11.

5. A process as claimed in claim 3, wherein said chelating agent is one or more materials selected from the group consisting of amines, aminopolycarboxylic acids, polyvalent carboxylic acids, aromatic carboxylic acids oxycarboxylic acids, ketocarboxylic acids, thiols, sulfur compounds, amino acids, diketones, and phosphonic acids.

6. A process as claimed in claim 1, wherein the composition of the catalyst obtained is represented by the following empirical formula:

$$Mo_a Bi_b C_c D_d E_e F_f O_g (SiO_2)_h$$

wherein

C represents at least one element selected from the group consisting of Fe, Ni, Co, Mg, Cr, Mn, Zn, Pb, La and Ce;

D represents at least one element selected from the group consisting of Cu, Ga, Ge, Cd, In, Te, Sn, Sb, V, W, Re, Ru, Rh, Pd, Os, Ir, Pt, Th, U, Pr, Nd, Sm, Eu, Gd, Al, Ti, Ta, Nb and Zr;

E represents at least one element selected from the group consisting of P and B;

F represents at least one element selected from the group consisting of Li, Na, K, Rb, Cs, Ca, Sr, Ba and Tl; and O is oxygen; and a, b, c, d, e, f, g, and H each represents an atomic ratio, wherein when a is from 8 to 12, b is from 0.01 to 10 c is from 0.1 to 25, d is from 0 to 35, e is from 0 to 5, f is from 0 to 5, g is the number of oxygen atoms corresponding to the oxide formed by the above components; and h is from 0 to 200.

7. A process for producing a molybdenum bismuth-containing metal oxide catalyst comprising: mixing (I) a metal element-containing slurry which contains molybdenum and at least one metal element selected from the group consisting of Fe, Ni, Co, Mg, Cr, Mn, Zn, Pb, La and Ce and which has a pH of 6 or above, (II) a bismuth compound, a solution thereof or a slurry thereof, and (III) an aqueous solution containing iron ion and chelating agents, and then drying and calcining the mixture obtained.

8. A process as claimed in claim 7, wherein said process comprises heating said slurry (I), a mixture of said slurry (I) and said bismuth component (II), or a mixture of said slurry (I), said bismuth component (II) and said aqueous solution (III) to 50° to 120° C. while maintaining the slurry as such.

9. A process as claimed in claim 7, wherein said slurry contains silica sol, or silica sol and a chelating agent.

10. A process as claimed in claim 7, wherein said pH is within a range of 6.5 to 11.

11. A process as claimed in claim 9, wherein said chelating agent is one or more materials selected from the group consisting of amines, aminopolycarboxylic acids, polyvalent carboxylic acids, aromatic carboxylic acid, oxycarboxylic acids, ketocarboxylic acids, thiols, sulfur compounds, amino acids, diketones, and phosphonic acids.

12. A process as claimed in claim 7, wherein the composition of the catalyst obtained is represented by the following empirical formula:

$$Mo_aBi_bC_cD_dE_eF_fO_g(SiO_2)_h$$

wherein

C represents at least one element selected from the group consisting of Fe, Ni, Co, Mg, Cr, Mn, Zn, Pb, La and Ce;

D represents at least one element selected from the group consisting of Cu, Ga, Ge, Cd, In, Te, Sn, Sb, V, W, Re, Ru, Rh, Pd, Os, Ir, Pt, Th, U, Pr, Nd, Sm, Eu, Gd, Al, Ti, Ta, Nb and Zr;

E represents at least one element selected from the group consisting of P and B;

F represents at least one element selected from the group consisting of Li, Na, K, Rb, Cs, Ca, Sr, Ba and Tl; and O is oxygen; and a, b, c, d, e, f, g, and h each represents an atomic ratio, wherein when a is from 8 to 12, b is from 0.01 to 10, c is from 0.1 to 25, d is from 0 to 35, e is from 0 to 5, f is from 0 to 5, g is the number of oxygen atoms corresponding to the oxide formed by the above components; and h is from 0 to 200.

13. A process as claimed in claim 1, wherein said catalyst is a catalyst for ammoxidation reaction of an olefin.

14. A process as claimed in claim 1, wherein said catalyst is a catalyst for ammoxidation reaction of propylene.

15. A process as claimed in claim 1, wherein said pH is 8 or above.

16. A process as claimed in claim 1, wherein said pH is within a range of 8 to 11.

17. A process as claimed in claim 7, wherein said catalyst is a catalyst for ammoxidation reaction of an olefin.

18. A process as claimed in claim 7, wherein said catalyst is a catalyst for ammoxidation reaction of propylene.

19. A process as claimed in claim 7, wherein said pH is 8 or above.

20. A process as claimed in claim 7, wherein said pH is within a range of 8 to 11.

* * * * *